United States Patent Office 3,524,864
Patented Aug. 18, 1970

3,524,864
SULTONE ISOMERIZATION PROCESS
Joseph Rubinfeld and H. Leon Levinsky, Brooklyn, N.Y., assignors to Colgate-Palmolive Company, New York, N.Y., a corporation of Delaware
No Drawing. Filed Sept. 14, 1966, Ser. No. 579,214
Int. Cl. C07d 89/06
U.S. Cl. 260—327                                            6 Claims

ABSTRACT OF THE DISCLOSURE

Converting gamma sultones to delta sultones by concentrated sulfuric acid.

---

This invention relates to delta sultones and relates more particularly to the production of delta sultones.

In accordance with one aspect of this invention, we have discovered that long chain gamma sultones can be isomerized substantially quantitatively to the corresponding delta sultones by treating the gamma sultone with cold strong sulfuric acid.

In the preferred form of the invention, the gamma sultones are mono-sultones having about 8 to 30 carbon atoms and having the formula

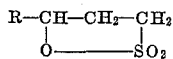

where R is an alkyl radical, such as a straight chain alkyl of about 5 to 27 carbons. Methods of producing gamma sultones are known to the art; typically they involve the reaction of an olefin, such as an alpha monoolefin, with noncomplexed $SO_3$ (e.g. $SO_3$ highly diluted with an inert gas such as air) to effect an addition of the $SO_3$ to the olefin with elimination of the double bond of the olefin.

The reaction conditions used in the process are such that at most a minor proportion (and preferably substantially none) of the sultone content of the reaction mixture is converted to alkenyl sulfonic acid. To this end the temperatures are kept relatively low; we have used temperatures below 25° C., e.g., about 10° C., and still lower temperatures (e.g., 0° C.) are preferred. Localized overheating can be avoided by adding the gamma sultone to a stirred liquid bath of cold strong sulfuric acid. Undesirable reaction conditions are indicated by the formation of dark colors (e.g., brown spots indicating localized overheating and formation of sulfonic acids) in the otherwise white or cream-colored reaction mixture.

The strength of the sulfuric acid employed in the reaction is above about 60% (i.e., it contains less than about 40% of water). Preferably, its strength is well above about 80%. 97–98% sulfuric acid has been employed with excellent results.

Only a small amount of sulfuric acid need be employed. For example, 2 ml. of concentrated sulfuric acid has been found to be more than ample for the substantially quantitative conversion of 10 grams of gamma sultone to delta sultone.

The process is highly effective in the treatment of normally solid sultones. It is not necessary to put the sultone in liquid condition. On the contrary, in a preferred form of the invention finely divided solid sultone is added directly to cooled liquid sulfuric acid to produce what looks like an icy slush of the flaky solid gamma sultone dispersed in the $H_2SO_4$, which slush then changes into a smooth liquid mixture of homogeneous appearance.

A convenient technique for recovering the delta sultone from the reaction mixture is to take it up in a nonaqueous inert solvent with which the sulfuric acid is immiscible, so that a layer of sulfuric acid separates from the mixture. Examples of suitable solvents are pentane, acetone, or ethanol. It is preferable to keep the mixture at a relatively low temperature (e.g., below about 25° C.) until the sulfuric acid has been substantially separated from the solution of the sultone. Another separation technique is to add cold water having a temperature below about 25° C. (e.g., ice water) to the reaction mixture; the delta sultone precipitates out and the impurities, sulfuric acid and byproducts are washed away with the aqueous phase.

The following examples are given to illustrate this invention further.

EXAMPLE 1

10 grams of finely divided crystalline $C_{16}$ gamma sultone (M.P. 69° C.) was slowly added, over a 10-minute period, to 2 ml. of cold concentrated (98%) $H_2SO_4$ and the reaction mixture was then stirred for 20 minutes. During all this time the reaction mixture was in a container cooled by an ice bath which maintained the mixture at a temperature of about 10–20° C. The mixture was then taken up in 100 ml. of pentane; two layers formed, and the bottom, sulfuric acid, layer was removed. The pentane layer was seeded with a crystal of $C_{16}$ delta sultone and cooled on an ice-sodium chloride bath, whereupon crystallization of delta sultone commenced. The delta sultone crystals were filtered off, giving a 96% yield of $C_{16}$ delta sultone (M.P. 59° C.).

The gamma sultone used in this example was obtained by reaction of $SO_3$ (highly diluted with inert gas) and hexadecene-1 in about 1:1 mole ratio, followed by neutralization of the resulting reaction product with excess sodium hydroxide and recovery of the gamma sultone from the reaction mixture and purification of this sultone by crystallization.

EXAMPLE 2

Example 1 was repeated up to the point of addition of the diluent (pentane). Instead of pentane, 100 ml. of ice water was then added. The delta sultone settled out, was filtered off and washed with water. 9.4 grams of the pure delta sultone were recovered.

EXAMPLE 3

Example 2 was repeated, using a $C_{18}$ gamma sultone obtaned from octadecene-1 instead of hexadecene-1. A delta sultone melting at about 65° C. was obtained.

Although the present invention has been described with reference to particular embodiments and examples, it will be apparent to those skilled in the art that variations and modifications can be substituted therefor without departing from the principles and true spirit of the invention.

We claim:
1. Process for producing a delta sultone, which comprises contacting the gamma sultone with concentrated sulfuric acid of above about 60% concentration, under such conditions that at most a minor proportion of the sultone content of the reaction mixture is converted to alkenyl sulfonic acid, and recovering delta sultones from the reaction mixture.

2. Process as in claim 1 in which solid gamma sultone of about 8 to 30 carbon atoms is added gradually to cooled sulfuric acid, while maintaining the reaction temperature below about 25° C.

3. Process as in claim 2 in which an inert diluent immiscible with sulfuric acid is added to the cool acidic reaction mixture to extract the delta sultone from the reaction mixture.

4. Process as in claim 2 in which a sulfuric acid-miscible inert diluent is added to the cool acidic reaction mixture to decrease the strength of the sulfuric acid.

5. Process as in claim 3 in which the diluent is cold water.

6. Process as in claim 2 in which the gamma sultone has the formula

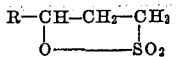

where R is alkyl.

References Cited
UNITED STATES PATENTS 3,222,275  12/1965  Krewer et al. _____ 208—180

JAMES A. PATTEN, Primary Examiner